Figure 1:
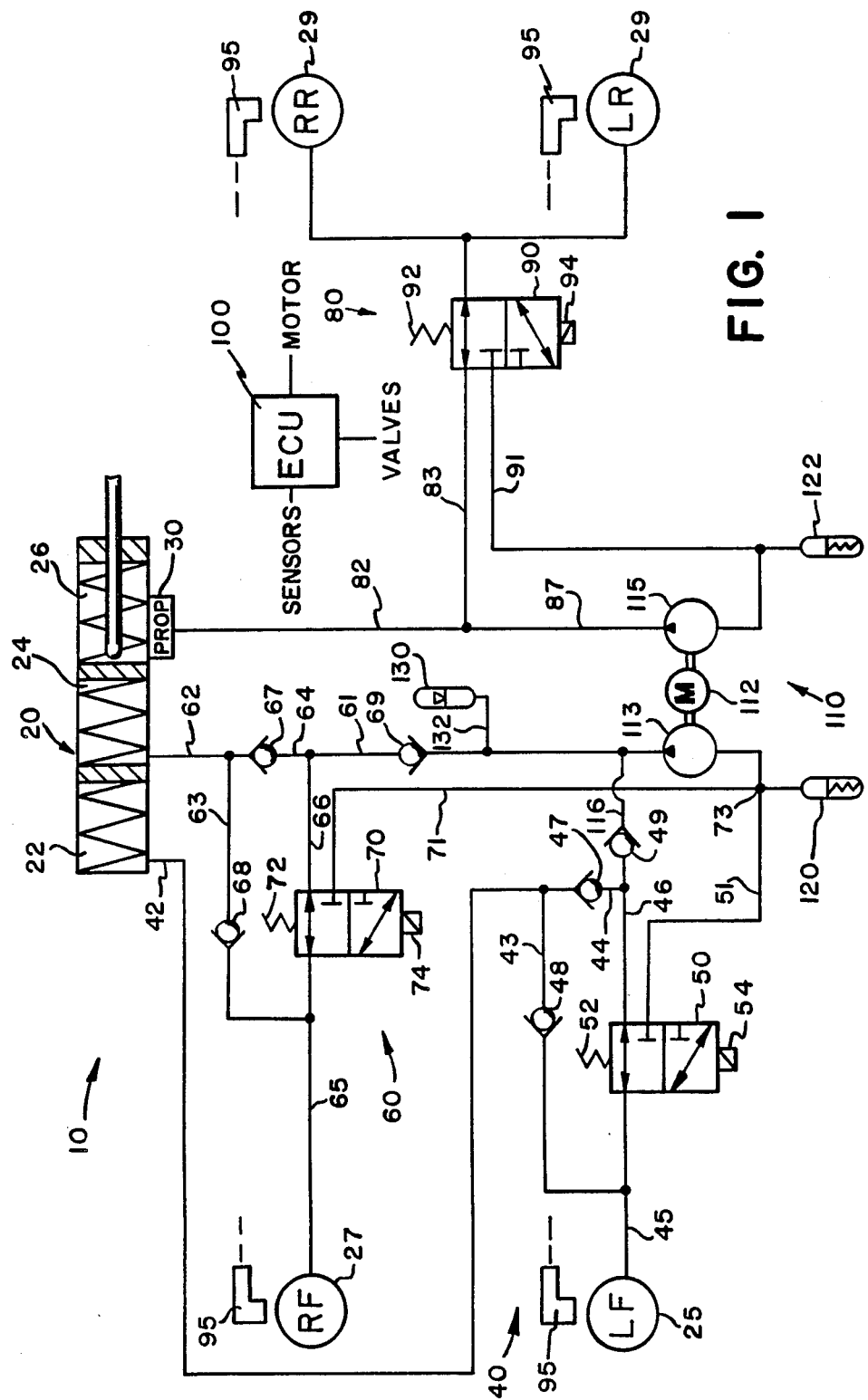

United States Patent [19]

Gatt et al.

[11] Patent Number: 4,869,561
[45] Date of Patent: Sep. 26, 1989

[54] THREE-CHANNEL ADAPTIVE BRAKING SYSTEM

[75] Inventors: Michael E. Gatt, Osceola; Arthur K. Brown, Jr.; Michael G. Pickett, bothof South Bend, all of Ind.

[73] Assignee: Allied-Signal Inc., Morristown, N.J.

[21] Appl. No.: 227,947

[22] Filed: Aug. 3, 1988

[51] Int. Cl.[4] .......................... B60T 13/70; B60T 8/44
[52] U.S. Cl. ..................................... 303/116; 303/114; 60/581
[58] Field of Search ................... 303/6.01, 10, 52, 61, 303/100, 113, 114, 115, 116, 119; 188/181 A, 358, 359, 360; 60/567, 581, 590, 591

[56] References Cited

U.S. PATENT DOCUMENTS

| | | | |
|---|---|---|---|
| 3,941,429 | 3/1976 | Kuwana | 303/113 |
| 3,972,192 | 8/1976 | Muterel | 60/562 |
| 4,057,301 | 11/1977 | Foster | 303/114 |
| 4,072,014 | 2/1978 | Gardner | 60/575 |
| 4,078,384 | 3/1978 | Shutt | 60/535 |
| 4,117,681 | 3/1978 | Falk | 60/562 |
| 4,119,196 | 4/1980 | Teluo | 303/6 C |
| 4,182,536 | 1/1980 | Pauwels | 303/116 |
| 4,213,655 | 7/1980 | Brademeyer | 303/6 C |
| 4,455,832 | 6/1984 | Gaiser | 60/581 |
| 4,482,190 | 11/1984 | Burgdorf et al. | 303/114 |
| 4,530,209 | 7/1985 | Steffes | 60/547 |
| 4,575,160 | 3/1986 | Leiber et al. | 303/114 X |
| 4,576,417 | 3/1986 | Dobner | 303/100 |
| 4,578,951 | 4/1986 | Belart et al. | 60/545 |
| 4,589,706 | 5/1986 | Leiber | 303/114 |
| 4,592,599 | 6/1986 | Belart | 303/119 |
| 4,687,260 | 8/1987 | Matsui et al. | 303/119 |
| 4,779,936 | 10/1988 | Farr | 303/116 |

FOREIGN PATENT DOCUMENTS

| | | | |
|---|---|---|---|
| 1940632 | 10/1978 | Fed. Rep. of Germany | 303/114 |
| 2944856 | 5/1981 | Fed. Rep. of Germany | 303/116 |
| 3641475 | 6/1988 | Fed. Rep. of Germany | 303/113 |
| 0004970 | 1/1977 | Japan | 303/116 |
| 0160343 | 7/1986 | Japan | 303/116 |
| 2165601 | 4/1986 | United Kingdom | 303/118 |

Primary Examiner—Andres Kashnikow
Assistant Examiner—Timothy Newholm
Attorney, Agent, or Firm—Larry J. Palguta; Ken C. Decker

[57] ABSTRACT

An adaptive braking system (10, 210) for an automotive vehicle provides a three-channel split pump-back system which may be utilized with either two- or three-chamber master cylinders. The three-channel adaptive braking system (10, 210) includes a first braking circuit (40) for controlling one of the front wheel brakes (25), a second braking circuit (60) for controlling the other of the front wheel brakes (27), and a third braking circuit (80) for controlling the rear wheel brakes (24). A two-section pump (110) provides hydraulic pressure for the first and second braking circuits (40, 60) and for the third braking circuit (80). Alternatively, a three-section pump (310) can provide hydraulic pressure for each of the circuits (40, 60, 80).

12 Claims, 2 Drawing Sheets

THREE-CHANNEL ADAPTIVE BRAKING SYSTEM

The invention relates generally to an adaptive braking system, and in particular to a three-channel split pump-back system.

Prior adaptive braking systems (anti-skid systems) typically utilize a two-chamber master cylinder with one of the chambers controlling the front wheel brakes via individual electrically actuated valves, and the other chamber controlling the rear wheel brakes via a single electrically actuated valve. In order to provide a cross-split system with the two-chamber master cylinder, the system typically utilizes one chamber of the master cylinder to control, via separate electrically actuated valves, one of the front wheels and the diagonally opposite rear wheel, while the other chamber of the master cylinder controls, via separate electrically actuated valves, the other front wheel brake and the diagonally opposite rear wheel brake. Thus, the utilization of a two-chamber master cylinder in a cross-split system requires the presence of four electrically actuated valves. It is desirable to provide a cross-split type of system which does not require four electrically actuate which can be utilized, with minor modification, both with a two-chamber master cylinder and a three-chamber master cylinder. A significant advantage is that such a standardized adaptive braking system can be utilized in both front wheel drive vehicles and rear wheel drive vehicles.

The present invention comprises an adaptive braking system for an automotive vehicle having a pair of axles with a pair of wheels and brakes on each axle, said system including a master cylinder for actuation by a vehicle operator, said master cylinder having first, second, and third separate, isolated chambers in which hydraulic braking pressure is developed when a brake application is effected, a first braking circuit hydraulically communicating said first chamber with the brake controlling one of the wheels on one of said axles, a second braking circuit hydraulically communicating said second chamber with the brake controlling the other wheel of said one axle, and a third braking circuit hydraulically communicating the third chamber with the brakes on the other axle, electrically actuated valve means in each of said braking circuits and for controlling hydraulic communication with the respective brakes, control means responsive to rotation of said wheels and for controlling said brakes by operating said electrically actuated valve means when an incipient skidding condition is detected, pump means separate from said master cylinder and for supplying make-up pressure to said brakes when control of the brakes is effected by said control means in response to said incipient skidding condition, and means hydraulically isolating said pump means from at least two of said chambers of the master cylinder.

Figure 2:
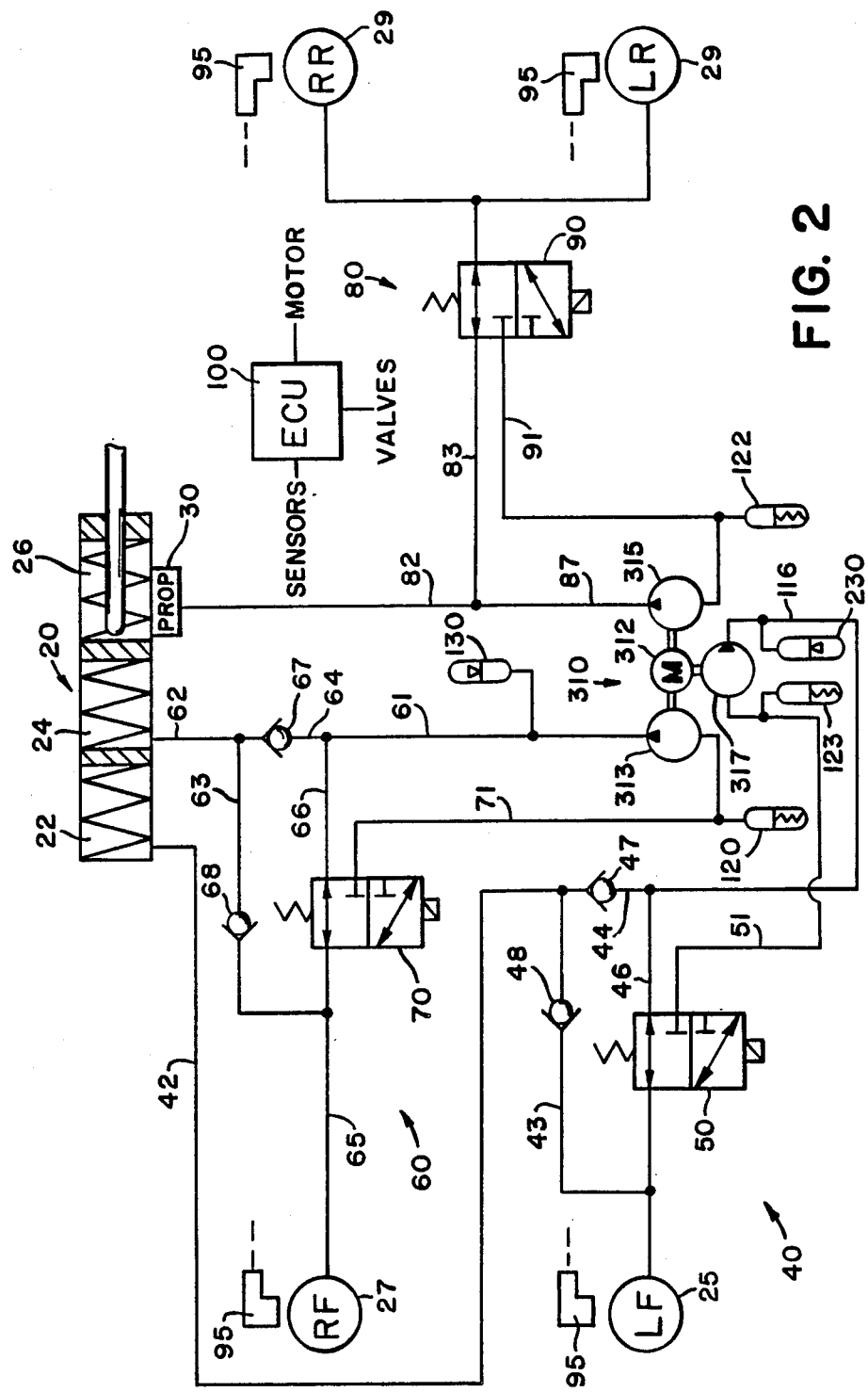

The invention is described in detail below with reference to the drawings which illustrate embodiments of the invention, in which:

FIG. 1 is a schematic illustration of the present invention utilizing a two-section pump; and FIG. 2 is a schematic illustration of the present invention utilizing a three-section pump.

The adaptive braking system of the present invention is indicated generally by reference numeral 10 in FIG. 1. Adaptive braking system 10 includes a three-chamber master cylinder 20 which comprises a first chamber 22 for communicating hydraulic fluid pressure to the left front brake 25, a second chamber 24 for providing hydraulic fluid pressure to the right front brake 27, and a third chamber 26 for providing hydraulic fluid to the rear wheel brakes 29. Master cylinder 20 may comprise any three-chamber master cylinder having three isolated chambers with pistons biased toward respective rest positions by associated springs, as is typically provided in a master cylinder construction. Third chamber 26 communicates with a proportioning valve 30 that controls appropriately hydraulic fluid pressure communicated to the rear wheel brakes 29. Adaptive braking system 10 comprises a first braking circuit 40, a second braking circuit 60, and a third braking circuit 80. The left front brake 25 and its associated wheel, and the right front brake 27 and its associated wheel include wheel speed sensors 95, as does the rear brakes and wheels 29. The outputs of wheel speed sensors 95 are communicated to an electronic control unit or control means 100 which processes the signals and communicates appropriate signals to electrically actuated valves and a pump motor. The first braking circuit 40 includes an electrically actuated valve 50, the second braking circuit 60 includes electrically actuated valve 70, and the third braking circuit 80 includes an electrically actuated valve 90, each of which communicates with the control means 100.

A pump 110 includes a pump motor 112 which operates a first pumping section 113 and a second pumping section 115. Pump 110 receives operating signals from the electronic control unit 100.

The electrically actuated valves 50, 70, and 90 are solenoid operated valves which contain spring-biased valving mechanisms that are moved against the force of the respective springs 52, 72, 92 by the associated solenoid actuators 54, 74, and 94. Each of the electrically actuated valves 50, 70, and 90 may be operated so as to permit hydraulic fluid pressure to be decayed away from the associated brake and toward the pump 110.

First braking circuit 40 includes a line 42 which receives hydraulic fluid pressure from first chamber 22 of master cylinder 20. Line 42 splits into lines 43 and 44, lines 44 and 46 permitting communication to and through the electrically actuated valve 50 to line 45 which communicates the hydraulic fluid pressure to the left front brake 25. Line 44 includes a check valve 47 which prevents hydraulic fluid pressure from being communicated from pump 110 via line 116 back through line 42 and toward the first chamber 22. Likewise, check valve 49 in line 116 prevents hydraulic fluid pressure of first chamber 22 from being communicated to the right front brake 27. Line 43 includes a check valve 48 which permits, upon release of the brakes, hydraulic fluid to return to first chamber 22 of master cylinder 10. Check valve 48 and line 43 are necessary in order to permit hydraulic fluid to return to first chamber 22 because check valve 47 prevents such return flow upon release of the brakes. Second braking circuit 60 includes essentially the same hydraulic flow connections as the first braking circuit. Second chamber 24 of master cylinder 20 communicates with line 62 which splits into two lines 63 and 64. Lines 64 and 66 permit hydraulic fluid communication, via check valve 67, with electrically actuated valve 70 and line 65 leading to right front brake 27. Bypass line 63 permits the return of hydraulic fluid, via check valve 68, to second chamber 24 during the release phase of braking. Bypass line 63 and check valve 68 are necessary because upon release of braking, hydraulic fluid cannot flow back through check valve 67 to second chamber 24. Lines 62 and 64 also connect with line 61 that communicates with the outlet side of first pumping section 113 via the check valve 69. Check valve 69 keeps the hydraulic fluid of second chamber 24 from flowing through line 61 to the left front brake 25, while check valve 67 in line 64 prevents pumping section 113 from communicating with second chamber 24 of master cylinder 20. In order to decay hydraulic fluid pressure from front brakes 25 and 27 during anti-skid operation, the first braking circuit 40 includes a decay line 51 which communicates electrically actuated valve 50 with the inlet side of first pumping section 113, and also with the inlet of spring-biased sump 120. Likewise, the electrically actuated valve 70 of circuit 60 communicates with line 71 that communicates, via a common connection 73, with the spring-biased sump 120 and inlet side of first pumping section 113. In case additional fluid pressure is needed, an accumulator 130 is provided and it communicates via line 132 with lines 61 and 116 so that fluid pressure may be provided to the respective first and second braking circuits 40 and 60. The third braking circuit 80 controls hydraulic fluid pressure application to the rear wheel brakes 29. Third chamber 26 of master cylinder 20 communicates via proportioning valve 30 and lines 82 and 83 with the electrically actuated valve 90 and rear wheel brakes 29. Electrically actuated valve 90 is connected with decay line 91 that communicates with the inlet of second pumping section 115 and spring-biased sump 122. The second pumping section 115 of pump 110 provides hydraulic fluid pressure via lines 87 and 83 to electrically actuated valve 90. Because of the reduced amount of braking effected by the rear wheel brakes as compared with the front wheel brakes, line 82 need not have a check valve in order to prevent the communication of small acceptable hydraulic fluid generated vibrations to the third chamber of master cylinder 20 and eventually to the vehicle operator via the brake pedal.

The three-channel adaptive braking system 10 operates upon the occurrence of an incipient skidding condition in order to minimize or prevent the wheels of the vehicle from skidding. When an incipient skidding condition is identified by electronic control unit 100 via wheel speed sensors 95, the electronic control unit sends appropriate signals to electrically actuated valves 50, 70, 90, and pump 110. Each of the electrically actuated valves is operated so that the hydraulic brake fluid pressure which has been transmitted via the respective lines 46, 66, and 83 to the associated wheel or wheels, is terminated and the hydraulic fluid pressures at the brakes are permitted to decay via the associated electrically actuated valves and decay lines 51, 71, and 91. At the same time, pump 110 is energized and hydraulic fluid pressure via first and second pumping sections 113 and 115 is communicated via lines 116 and 46 to the input side of electrically actuated valve 50, via lines 61 and 66 to the input side of electrically actuated valve 70, and via lines 87 and 83 to the input side of electrically actuated valve 90. The electronic control unit or control means 100 operates the electrically actuated valves to apply hydraulic fluid pressure and to decay hydraulic fluid pressure appropriately so that a skidding condition of the respective wheels is avoided. Upon the release of braking via master cylinder 20, the hydraulic fluid pressure in left front brake 25 of first braking circuit 40 is permitted to return to first chamber 22 of master cylinder 20 via and lines 45, 43, check valve 48, and line 42. Likewise, the hydraulic fluid pressure in right front brake 27 returns to second chamber 24 of master cylinder via, and lines 65, 63, check valve 68, and line 62. The hydraulic fluid pressure in the rear wheel brakes 29 may return to third chamber 26 via lines 83 and 82.

If it is desired to provide a three-channel adaptive braking system which provides increased isolation of the braking circuits in order to prevent any, type of interaction between first braking circuit 40 and second braking circuit 60, then a three-section pump may be utilized. FIG. 2 illustrates an alternative embodiment in which the braking circuits are essentially the same as in FIG. 1, but which includes a three-section pump 310. Three-section pump 310 includes first pumping section 317, second pumping section 313, and third pumping section 315. The motor 312 drives each of the pumping sections so that they provide hydraulic fluid pressure to the respective braking circuit. The first braking circuit 40 includes a decay line 51 which communicates with the spring-biased sump 123 and the inlet side of first pumping section 317. The second braking circuit 60 includes the decay line 71 which communicates with the spring-biased sump 120 and second pumping section 313. Because the first and second braking circuits 40 and 60 are isolated totally from one another, an additional accumulator 230 is required for first braking circuit 40, the accumulator 230 communicating with outlet line 116 from first pumping section 317. The third braking circuit 80 includes a decay line 91 which communicates with the spring-biased sump 122 and third pumping section 315.

As can be seen by comparing the two above-described adaptive braking systems, the check valves 49 and 69 in FIG. 1 are not required in braking system 210 of FIG. 2 because three-section pump 310 provides for the effective isolation of the first and second braking circuits. Three-channel adaptive braking system 210 operates the same as described above for system 10.

The adaptive braking systems disclosed herein offer considerable advantages over prior adaptive braking systems First, the hydraulic circuitry of the basic adaptive braking system may be utilized, with minor modification, with either a two-chamber or a three-chamber master cylinder, thereby permitting the system to be utilized, without different tooling costs, for both vertical split systems and diagonal split systems. The three-channel "Y" split brake system described above provides alternative hydraulic brake split systems which may replace the more traditional and previous diagonal or "X" split systems that are now utilized on most front wheel drive vehicles. As a result, there can be provided improved partial failure stopping performance by the normal braking system simplified hydraulic plumbing wherein only one line is required to communicate with the rear brakes, only one instead of two proportioning valves with the single proportioning valve being provided for the rear wheel brakes, the elimination of one anti-lock braking system channel because one electrically actuated valve has been eliminated and only three are required, and the provision of a commonized anti-lock braking system for split braking systems.

Other provisions of the invention or variations will become apparent to those skilled in the art and will suggest themselves from the specific applications of the invention. It is intended that such variations and revisions of the invention, as are to be expected on the part of those skilled in the art, to suit individual design preference and which incorporate the herein disclosed principles, will be included within the scope of the following claims as equivalents thereof.

We claim:

1. A closed circuit, pump-back adaptive braking system for an automotive vehicle having a pair of axles with a pair of wheels and brakes on each axle, said system including a master cylinder for actuation by a vehicle operator, said master cylinder having first, second, and third separate, isolated chambers in which hydraulic braking pressure is developed when a brake application is effected, a first braking circuit hydraulically communicating said first chamber with the brake controlling one of the wheels on one of said axles, a second braking circuit hydraulically communicating said second chamber with the brake controlling the other wheel of said one axle, and a third braking circuit hydraulically communicating the third chamber with the brakes on the other axle, electrically actuated valve means in each of said braking circuits and for controlling hydraulic communication with at least one respective brake, controlling said brakes by operating said electrically actuated valve means when an incipient skidding condition is detected, pump means separate from said master cylinder and for supplying make-up pressure to said brakes when control of the brakes is effected by said control means in response to said incipient skidding condition, mechanisms hydraulically isolating said pump means from at least two of said chambers of the master cylinder, each of said first and second circuits including a first branch communicating the respective chamber and the pump means with the respective brake and a second branch bypassing the associated electrically actuated valve means and having a common portion with the first branch, each mechanism comprising check valve means disposed in the respective common portion and preventing communication of said pump with said respective chamber through the respective common portion, said pump means including a first pumping section having an inlet and outlet and a second pumping section having an inlet and outlet separate from the inlet and outlet of the first pumping section, the inlet and outlet of said first pumping section being connected with at least one of said first and second braking circuits, and the second pumping section being connected with said third braking circuit and being hydraulically isolated from the first and second braking circuits.

2. The adaptive braking system in accordance with claim 1, wherein said first and second braking circuits each include further check valve means preventing communication of the respective circuit with the other of said first and second braking circuits.

3. The adaptive braking system in accordance with claim 1, wherein said pump means is operated by an electric motor, said electric motor being actuated by said control means to selectively supply braking pressure to said brakes when control of the brakes is effected by said control means.

4. The adaptive braking system in accordance with claim 1, wherein said electrically actuated valve means is shiftable in response to signals generated by said control means from a first condition communicating a brake with its corresponding chamber of the master cylinder and with an outlet of said pump means to a second position in which communication to said corresponding chamber of the master cylinder is cut off and communication with an inlet of said pump means is effected to effect thereby a reduction in braking pressure.

5. The adaptive braking system in accordance with claim 1, wherein said check valve means comprise first and second check valves located respectively in said first braking circuit between the outlet of the pumping section and said first chamber and in said second braking circuit between the outlet of said first pumping section and said second chamber of the master cylinder.

6. The adaptive braking system in accordance with claim 5, wherein said first and second braking circuits include a common connection communicating with the inlet of said first pumping section.

7. The adaptive braking system in accordance with claim 1, wherein said pump means further comprises a third pumping section, each pumping section having an inlet and an outlet separate from the inlets and outlets of the other pumping sections, and each pumping section communicating with the respective braking circuit.

8. The adaptive braking system in accordance with claim 7, wherein said check valve means comprise first and second valves located respectively in said first braking circuit between the outlet of the first pumping section and said first chamber and in said second braking circuit between the outlet of said second pumping section and said second chamber of the master cylinder.

9. The adaptive braking system in accordance with claim 8, wherein each of the braking circuits includes sump means communicating with the respective pumping section.

10. The adaptive braking system in accordance with claim 9, wherein the first and second braking circuits each include accumulator means communicating with the respective electrically actuated valve means.

11. The adaptive braking system in accordance with claim 10, wherein the third chamber communicates with the third braking circuit via proportioning valve means.

12. The adaptive braking system in accordance with claim 11, wherein the outlet of the third pumping section communicates with the proportioning valve means.

* * * * *

UNITED STATES PATENT AND TRADEMARK OFFICE
CERTIFICATE OF CORRECTION

PATENT NO. : 4,869,561

DATED : September 26, 1989

INVENTOR(S) : Michael E. Gatt, et al

It is certified that error appears in the above-identified patent and that said Letters Patent is hereby corrected as shown below:

Claim 1, line 18, after "brake," insert --control means responsive to rotation of said wheels and for--.

Signed and Sealed this

Twenty-fourth Day of September, 1991

Attest:

HARRY F. MANBECK, JR.

Attesting Officer

Commissioner of Patents and Trademarks